United States Patent [19]
Rissler

[11] 3,746,029
[45] July 17, 1973

[54] RELEASE DEVICE FOR FLOODING SPACES SUBJECTED TO PRESSURE

[75] Inventor: Peter Rissler, Johlingen, Germany

[73] Assignee: Siemens Aktiengesellschaft, Berlin, Germany

[22] Filed: Aug. 23, 1971

[21] Appl. No.: 173,745

[30] Foreign Application Priority Data
Aug. 22, 1970 Germany................... P 20 41 791.8

[52] U.S. Cl...................... 137/81, 137/398, 176/38
[51] Int. Cl............................................ F16k 17/36
[58] Field of Search...................... 137/81, 166, 397, 137/398; 176/38

[56] References Cited
UNITED STATES PATENTS

| 316,567 | 4/1885 | Pierson | 137/397 |
|---|---|---|---|
| 3,207,671 | 9/1965 | Kornbichler | 176/38 |

*Primary Examiner*—Robert G. Nilson
*Attorney*—Arthur E. Wilfond, Herbert L. Lerner et al.

[57] ABSTRACT

Release device for flooding spaces subject to pressure includes a water supply tank having a wall formed with an opening therein and adapted to contain a supply of water up to a given level below the top of the wall, at least one hinged flap extending across the opening for closing the opening and hinged at the upper end thereof to the wall, the flap being openable toward the outside of the tank, tow hook means secured at one end thereof to the lower end of the hinged flap and at the other end thereof in a recess formed in the wall, the wall being formed with a chamber located above the hinged flap and communicating with the interior of the tank, the chamber being adapted to contain water up to the given level and air above the given level and including a partition extending from the top of the wall to a location below the given water level, float means disposed in the chamber so as to float at the given level on water contained in the chamber, and a pull rope connecting the float means and the tow hook for lifting the tow hook to open the hinged flap when a pressure increase occurs in the air above the water in the interior of the supply tank causing the given level of water in the interior of the tank to drop and the given level of water in the chamber to rise.

2 Claims, 3 Drawing Figures

RELEASE DEVICE FOR FLOODING SPACES SUBJECTED TO PRESSURE

The invention relates to a release device for flooding spaces subject to pressure, such as in nuclear reactors, particularly.

In installations in which thermal processes occur, accidents frequently lead to the release of large quantities of superheated steam. Such installations can be chemical plants or thermal or nuclear power plants. In any event, attempts are made to condense the escaping steam as quickly as possible. In many cases, cold water which acts as a heat sink is best suited for this purpose. A problem arises, however, in transporting a supply of water which is stored elsewhere, to the source of the heat or the point of escape of the steam as quickly as possible. It must be assumed that, due to the conditions existing during the accident, the important command and supply cables and wires for the valves etc. have been damaged, so that the operating or servicing personnel is also not available and the manually operated fittings and valves cannot be reached.

It is therefore an object of the invention to provide a release device for flooding spaces subjected to pressure, which operates completely independently of power supplies and operating personnel by utilizing only the physical conditions of the flooding, i.e., which operate passively.

With the foregoing and other objects in view there is provided in accordance with the invention, release device for flooding spaces subject to pressure comprising a water supply tank having a wall formed with an opening therein and adapted to contain a supply of water up to a given level below the top of the wall, at least one hinged flap extending across the opening for closing the opening and hinged at the upper end thereof to the wall, the flap being openable toward the outside of the tank, tow hook means secured at one end thereof to the lower end of the hinged flap and at the other end thereof in a recess formed in the wall, the wall being formed with a chamber located above the hinged flap and communicating with the interior of the tank, the chamber being adapted to contain water up to the given level and air above the given level and including a partition extending from the top of the wall to a location below the given water level, float means disposed in the chamber so as to float at the given level on water contained in the chamber, and a pull rope connecting the float means and the tow hook for lifting the tow hook to open the hinged flap when a pressure increase occurs in the air above the water in the interior of the supply tank causing the given level of water in the interior of the tank to drop and the given level of water in the chamber to rise.

The result thereof is that when a pressure increase occurs in the air space above the water supply tank, the hinged flap is unlocked or released solely by the equalization of the pressure above the water surface of the tank and within the float chamber so that the water from the tank can flow directly, for example, into the reactor chamber of a nuclear reactor installation.

Other features which are considered as characteristic for the invention are set forth in the appended claims.

Although the invention is illustrated and described herein as embodied in release device for flooding spaces subjected to pressure, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawing, in which.

The illustrated embodiment is assumed to be installed in a nuclear reactor. The fuel element storage tank of the reactor is used as the water supply tank. However, it is possible, in similarly situated processes wherein rapid condensation of escaping steam is important, to use any desired water supply tank.

Figure 1:
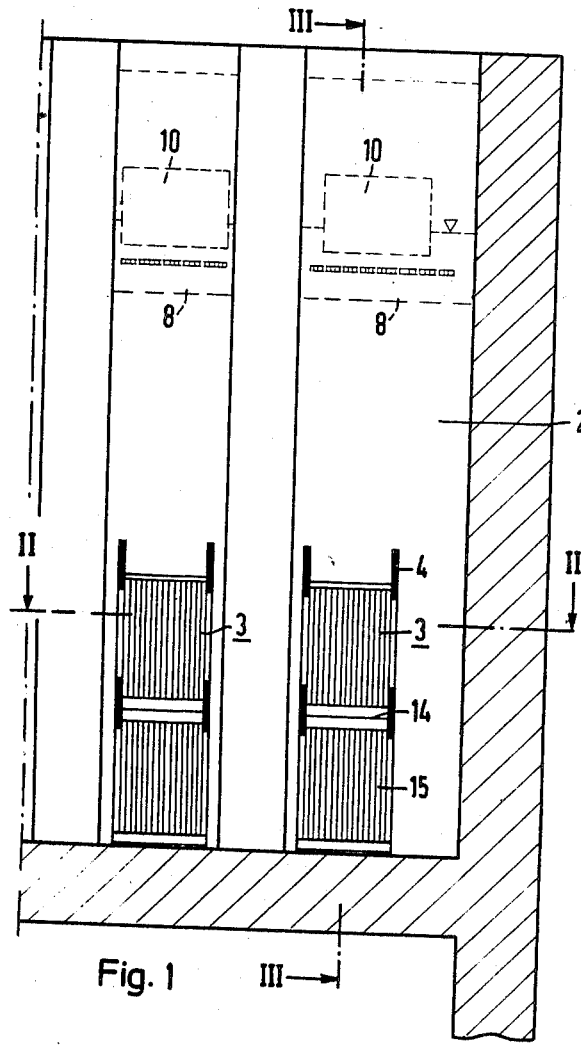
FIG. 1 is an elevational view, partly in section, of the wall of the water supply tank with the corresponding hinged flaps according to the invention.
Figure 2:
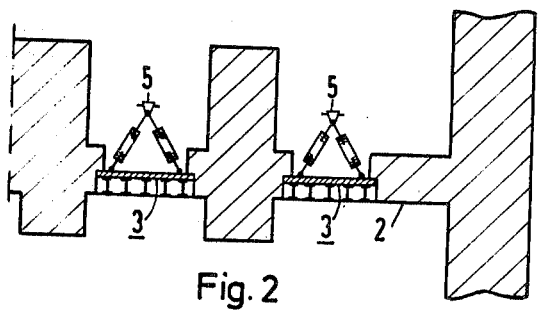
FIG. 2 is a cross-sectional view of FIG. 1 taken along the line II—II in the direction of the arrows.

Referring now to the drawing, there is provided in FIG. 1 an external view toward the wall 2 of the fuel element tank 1, the wall 2 being also shown partly in section. At the lower end of the wall, hinged flaps 3 are mounted across corresponding openings in the wall 2. As may be seen particularly from FIG. 2, the hinged flaps 3 are hinged at the upper end thereof by a holder 4 so that they can open outwardly. According to the sectional views of FIGS. 2 and 3, the hinged flaps 3 are held at the lower end thereof, for example, by tow hooks 5 secured thereto on the water side or interior of the tank 1 and fitted into a recess 6 formed in the wall 2 of the fuel element tank or water supply tank 1.

Figure 3:
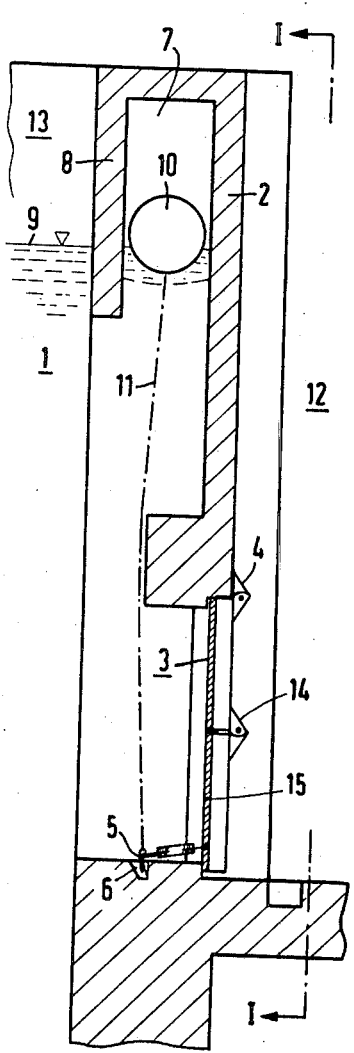
FIG. 3 is a sectional view of FIG. 1 taken along the line III—III in the direction of the arrows.

As can be seen from FIG. 3, the upper end of the wall 2 is formed with a chamber 7 that is open toward the bottom thereof so that it communicates with the interior of the tank 1 and is partially filled with air. The chamber 7 is separated from the interior of the supply tank 1 proper by a partition 8 which extends below the water surface or level 9. In the chamber 7 there is located a float 10 at the water level 9 which is connected with the tow hook 5 by a pull rope 11.

The operation of the release device of the invention is effected as follows:

The instant steam escapes, for example, in the event of a rupture of the reactor pressure vessel or a primary coolant line in the reactor chamber 12 proper, there develops in the space 13 above the water surface 9 an increased internal pressure which prevails above the free level of the supply tank. The free water level 9 and the level of the water in the chamber 7 will then adjust themselves to different elevations, i.e. the water level in the interior of the tank 1 will drop while the water level in the chamber 7 will rise, as the air in the chamber 7 is compressed, for reasons of equilibrium, by the amount of pressure increase in the space 13. For a pressure increase of 1 kg/cm², for example, the water level in the chamber 7 will rise by about one half of the original height of the air space above it. Displacement forces, which depend only upon the size of the float 10, are thereby applied to the float 10 which is anchored by the pull rope 11. Due to this elevation of the float 10, the tow hook 5 is now also raised, so that the hinged flap 3 is released. The water pressure in the tank 1 then pushes the hinged flaps 3 wide open and accordingly empties the tank into the installation room 12, where immediate condensation of the steam released by the mishap takes place.

Though not necessary, it is possible to construct the hinged flap 3 in two parts, with a horizontally extending folding or hinge pivot axis 14, so that the lower part 15 of the hinged flap 3 swings out first about the pivot axis 14. Assurance is provided thereby that when the medium such as steam blows out of the area of the installation or reactor chamber 12, the lower flap part 15 is entrained by the blowout jet first, so that the water can flow out of the tank 1 more easily.

With the release device of the invention described herein, reliable opening of the hinged flaps and consequently rapid flooding of the endangered chambers is therefore assured without requiring any additional energy sources.

It is claimed:

1. Release device for flooding spaces subject to pressure comprising a water supply tank having a wall formed with an opening therein, and adapted to contain a supply of water up to a given level below the top of said wall at least one hinged flap extending across said opening for closing said opening and hinged at the upper end thereof to said wall, said flap being openable toward the outside of said tank, tow hook means secured at one end thereof to the lower end of said hinged flap and at the other end thereof in a recess formed in said wall, said wall being formed with a chamber located above said hinged flap and communicating with the interior of the tank, said chamber being adapted to contain water up to said given level and air above said given level and including a partition extending from the top of said wall to a location below said given water level, float means disposed in said chamber so as to float at said given level on water contained in said chamber, and a pull rope connecting said float means and said tow hook means for lifting said tow hook means to open said hinged flap when a pressure increase occurs in the air above the water in the interior of said supply tank causing the given level of water in the interior of said tank to drop and the given level of water in said chamber to rise.

2. Release device according to claim 1 wherein said hinged flap is formed of an upper and a lower part mutually connected by a hinge having a horizontal pivot axis, said lower hinge part being swingable outwardly initially about said horizontal pivot axis.

* * * * *